United States Patent [19]

Smith

[11] Patent Number: 5,745,103
[45] Date of Patent: Apr. 28, 1998

[54] REAL-TIME PALETTE NEGOTIATIONS IN MULTIMEDIA PRESENTATIONS

[75] Inventor: Matthew W. Smith, Tulsa, Okla.

[73] Assignee: Microsoft Corporation, Redmond, Wash.

[21] Appl. No.: 510,258

[22] Filed: Aug. 2, 1995

[51] Int. Cl.$^6$ .................................................. G09G 5/06
[52] U.S. Cl. ........................ 345/199; 345/150; 345/153
[58] Field of Search .................................. 345/199, 186, 345/150, 153, 154, 155, 431; 348/32–34, 172, 642, 692; 358/518, 523; 382/162, 167

[56] References Cited

U.S. PATENT DOCUMENTS

| | | | |
|---|---|---|---|
| 5,140,312 | 8/1992 | Ishii | 345/153 |
| 5,459,486 | 10/1995 | Iverson et al. | 345/199 |
| 5,608,626 | 3/1997 | Hester | 345/153 |

*Primary Examiner*—Dennis-Doon Chow
*Attorney, Agent, or Firm*—Ronald M. Anderson

[57] ABSTRACT

A method and system for determining an optimal color palette for simultaneously displaying multiple graphic objects associated with different color palettes, particularly, when a new object may subsequently be added to the display. A multimedia authoring system that is used to specify graphic objects appearing on a page of the multimedia work incorporates machine instructions for creating the optimal color palette used in displaying the graphic objects when the multimedia work is run on a personal computer system (10). Preferably, the optimal color palette has up to 256 colors, including 20 that are used by the graphic user interface operating system. Colors are added to the optimal color palette by hashing the colors used in the color palettes associated with each of the graphic objects included on a page of the multimedia work, until the color palettes associated with all objects on a page have been processed or until all available colors in the optimal color palette are used. The author of the work has the ability to set a tolerance applied in the hashing process so that only colors in the color palettes of the graphic objects that differ from colors already added to the hash table by more than selected tolerances for all of the red, green, and blue components are included in the optimal color palette.

30 Claims, 4 Drawing Sheets

| SYS 1 | SYS 2 | SYS 3 | SYS 4 | SYS 5 | SYS 6 | SYS 7 | SYS 8 | SYS 9 | SYS 10 | P 11 | P 12 | P 13 | P 14 | P 15 | P 16 |
|---|---|---|---|---|---|---|---|---|---|---|---|---|---|---|---|
| P 17 | P 18 | P 19 | P 20 | P 21 | P 22 | P 23 | P 24 | P 25 | P 26 | P 27 | P 28 | P 29 | P 30 | P 31 | P 32 |
| P 33 | ... | ... | ... | ... | ... | ... | ... | ... | ... | ... | ... | ... | ... | ... | ... |
| ... | ... | ... | ... | ... | ... | ... | ... | ... | ... | ... | ... | ... | ... | ... | ... |
| ... | ... | ... | ... | ... | ... | ... | ... | ... | ... | ... | ... | ... | ... | ... | ... |
| ... | ... | ... | ... | ... | ... | ... | ... | ... | ... | ... | ... | ... | ... | ... | ... |
| ... | ... | ... | ... | ... | ... | ... | ... | ... | ... | ... | ... | ... | ... | ... | ... |
| ... | ... | ... | ... | ... | ... | ... | ... | ... | ... | ... | ... | ... | ... | ... | ... |
| ... | ... | ... | ... | ... | ... | ... | ... | ... | ... | ... | ... | ... | ... | ... | ... |
| ... | ... | ... | ... | ... | ... | ... | ... | ... | ... | ... | ... | ... | ... | ... | ... |
| ... | ... | ... | ... | ... | ... | ... | ... | ... | ... | ... | ... | ... | ... | ... | ... |
| ... | ... | ... | ... | ... | P 246 | SYS 247 | SYS 248 | SYS 249 | SYS 250 | SYS 251 | SYS 252 | SYS 253 | SYS 254 | SYS 255 | SYS 256 |

| R | G | B |
|---|---|---|
| 0-255 | 0-255 | 0-255 |

REAL-TIME PALETTE NEGOTIATIONS IN MULTIMEDIA PRESENTATIONS

FIELD OF THE INVENTION

The present invention generally relates to a method and system for controlling the color palette used in a visual display, and more specifically, to a method and system for determining an optimal color palette for use on a computer display when different palettes are specified for display on a computer monitor at the same time.

BACKGROUND OF THE INVENTION

With the increased popularity of graphic user interface operating systems having a rich visual content, such as Microsoft Corporation's WINDOWS™, it has become relatively commonplace for applications to display graphics with a palette of at least 256 different colors. Although 24-bit graphic cards are readily available that can display up to 16 million colors at one time, speed and graphic file storage size often impose a practical limit of 256 colors out of all the possible colors that can be displayed using eight bits to define the color of each pixel. Many applications intended to run under a graphic user interface operating system are capable of using only 16 colors, although use of 256 colors is becoming more common, particularly in games or other programs that can benefit from the enhanced use of color. Although eight bits of color does not provide the full range of color shading perceptible by the eye, at higher screen resolution, graphic images displayed using only 256 colors can appear almost as realistic as traditional color photographic images.

Microsoft Corporation's WINDOWS graphic user interface operating system reserves 20 colors of 256 colors or more for use in displaying graphic elements of the operating system such as scroll bars, title bars, fonts, etc. Although dithered colors using these reserved colors are selectable by the user with a color control utility program that is provided under the Control Panel, there is no provision for selecting different colors for use by the system. Thus, with a limit of 256 colors, applications running under the WINDOWS graphic user interface operating system can assign only the remaining 236 colors to the palette of 256 colors shared by all of the graphic objects simultaneously displayed on a screen. However, each graphic image attempts to use its own palette of colors. The color palette used by one image may be very different than that used by another. For example, one image may use a color palette comprising various shades of blue and gray, while another uses a color palette comprising mostly shades of red and green. If both images are simultaneously displayed on the screen, a common color palette is used to display the images, and this common color palette is derived from the different color palettes used by the two images. The technique conventionally used by WINDOWS to produce a common color palette for a plurality of different graphic objects can therefore cause images to appear very different than they would if displayed alone on a screen because of changes to their color.

To determine a 256-color common palette for displaying graphic objects developed with different color palettes, WINDOWS determines a palette for use in displaying objects using a linear transversal technique, giving priority to the palette of an object that is in the foreground of a window. This approach can cause an object in the background to be displayed with colors that are very different than those used in its original color palette.

Another approach that has been used in the prior art to determine a palette for displaying two or more objects that have different palettes employs a color histogram to select the colors from the color palettes used by all of the graphic objects that appear most frequently. The resulting palette is then employed to display all of the objects and does an excellent job. However, there is a problem with using the histogram technique to determine this "merged" color palette when the number of objects being displayed on a screen is subject to change. Specifically, each time that a graphic object is added to the screen, the graphic user operating system must again determine a new color histogram from the color palettes of all of the distinct graphic objects and then, more importantly, each object must be remapped to the new common merged color palette. The remapping of objects to a new color palette when a new graphic object is added to a display screen is very computationally intensive.

Thus, a better approach is required for selecting the colors in a common palette that will be used to display multiple graphic objects associated with different color palettes on a screen, particularly in a situation when new graphic objects may be added to the display at different times. Ideally, the colors in this common palette should be uniformly distributed among the actual colors used in all of the color palettes associated with the graphic images that are simultaneously displayed on the screen. Furthermore, as any new graphic object or image is added that has yet another color palette associated with it, any required changes in the common color palette should be made quickly, by simply adding colors from the new object's color palette to the common merged color palette if such colors were not previously used. If too many different colors are used by the graphic images to be displayed (i.e., more than the available 256 colors), the technique should be able to reduce the number of colors in the palette in a manner that most faithfully depicts the colors of all of the graphic images or objects simultaneously appearing on the screen. It should also be possible to fine tune the variation in color shadings by selecting a tolerance value for the variations that will control the number of color shades used in the common palette.

SUMMARY OF THE INVENTION

In accordance with the present invention, a method is defined for determining an optimal color palette that will be employed in displaying a plurality of graphic objects on a computer display, each graphic object having an associated color palette. The method includes the step of creating a table having a variable number of entries. Each entry corresponds to a different color in the optimal color palette. The colors from the color palettes associated with each of the graphic objects are evaluated to add colors to the table to ensure that the colors added differ from any previous entry in the table by more than a predefined tolerance, until all of the colors from the color palettes have been evaluated. All colors entered into the table are then assigned to the optimal color palette.

Once the optimal color palette has thus been determined, it is used to depict the graphic objects on the computer display. If a new graphic object is added to the graphic objects to be displayed, the method will further include the step of adding additional entries to the optimal color palette. Colors in the color palette associated with the new graphic object are added to the optimal color palette if they differ from the colors in the table by more than the predefined tolerance.

The method also includes the step of selectively modifying the predefined tolerance to change a range of variation in the colors comprising the optimal color palette. In the preferred embodiment, a subset of the colors in the optimal color palette are reserved for use by a graphic user interface system.

Another aspect of the present invention is directed to a system for determining an optimal color palette for use in displaying multiple graphic objects, where each graphic object has an associated color palette, and the optimal color palette has a predetermined maximum number of colors. The system comprises a computer that includes a central processing unit (CPU), a memory for storing machine instructions that control the CPU, and a monitor that is coupled to the CPU, for displaying text and graphic images and objects. A non-volatile storage medium is provided in which are stored machine instructions that are selectively loaded into memory to control the CPU. Also, an operator interface is included to enable a user to provide input to the CPU. Machine instructions that are stored on the non-volatile storage medium, when loaded into memory and executed by the CPU, comprise a plurality of means for implementing functions in accord with the present invention. Specifically, the machine instructions define means for hashing colors in the color palettes associated with the plurality of graphic objects to select colors for entry in the optimal color palette by comparison to a predefined tolerance. Also, the CPU executing the machine instructions comprises means for displaying the graphic objects on the monitor using the optimal color palette. These and other functions that are generally consistent with the method described above are carried out by the CPU of the computer when it executes the machine instructions.

Another aspect of the present invention is directed to an article of manufacture that includes a memory medium for storing machine instructions that are executable by a computer. The machine instructions implement functions that are generally equivalent to the steps of the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
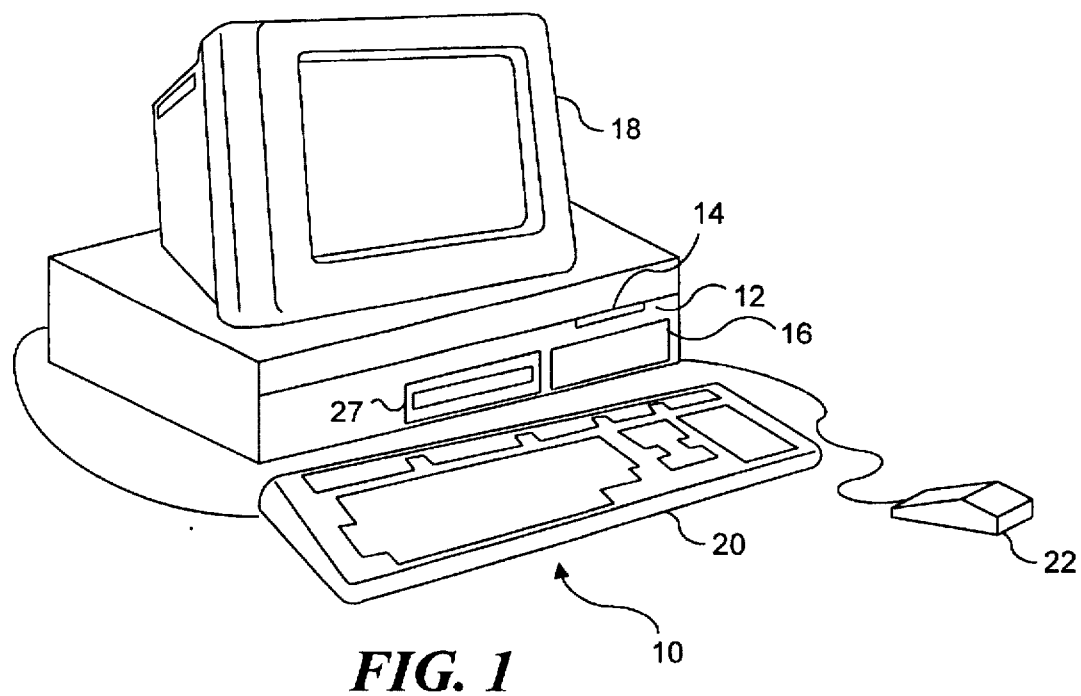
FIG. 1 is an isometric view of a computer system suitable for implementing the present invention.
Figure 2:
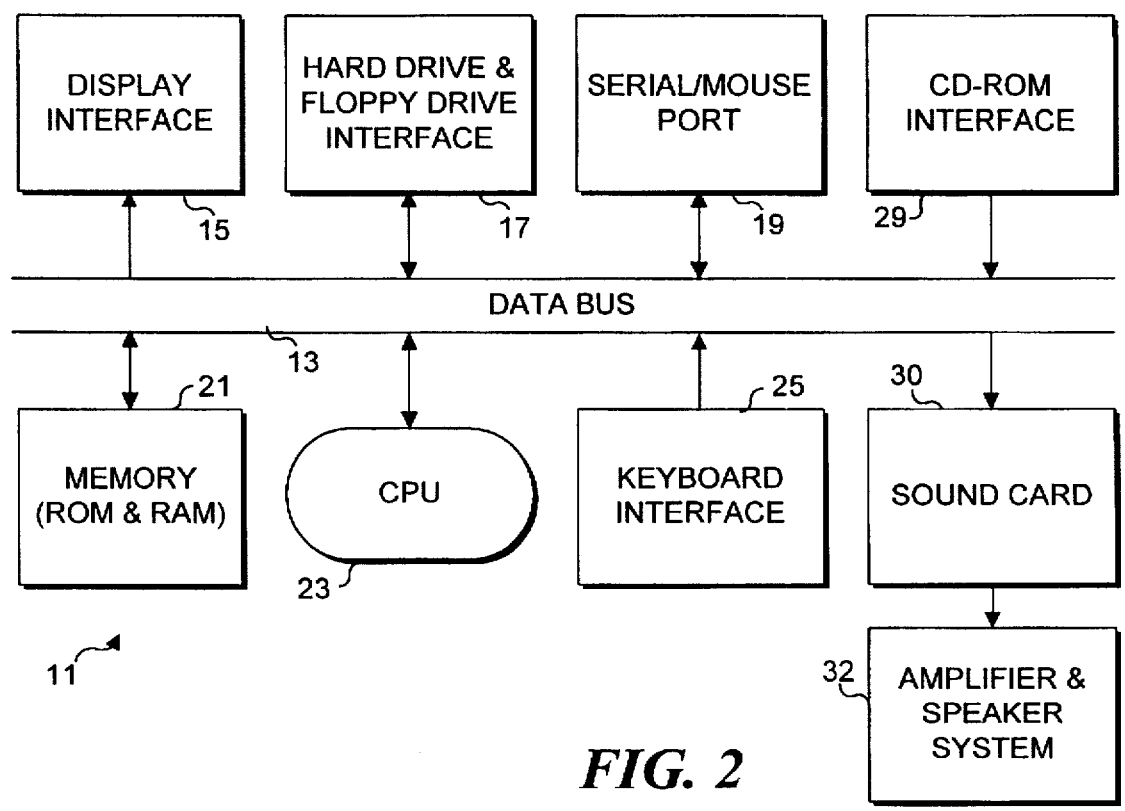
FIG. 2 is a schematic block diagram showing internal components of the computer system in FIG. 1.

A personal computer system 10, which is suitable for implementing the present invention, is illustrated in FIGS. 1 and 2. Personal computer system 10, which is generally conventional, includes a processor chassis 12 in which is disposed a CPU 23. The CPU is mounted on a motherboard, along with a number of other support circuits and components. The operating circuitry of personal computer systems are well known to those of ordinary skill in the art and need not be disclosed in detail, beyond the broad discussion that follows, in order to properly disclose the present invention. Although a desktop personal computer system is shown in FIG. 1, it will be apparent that other types of computers can alternatively be employed to implement the present invention, including workstations on a network and even laptop computers. The invention is not processor dependent and can be implemented on virtually any computer that uses paletted video hardware for driving a display, by appropriate modifications to software by which the invention is implemented. This invention is useful on personal computers and in connection with applications that employ paletted video hardware for displaying graphic objects.

Mounted within processor chassis 12 are a floppy disk drive 14 and a hard drive 16. Floppy drive 14 is provided for use with floppy disks from which files and data can be read, or alternatively, to which files or data can be written. Similarly, hard drive 16 is used for storing files and data for subsequent use. A display monitor 18 is disposed atop processor chassis 12 and serves for displaying text, images, and graphic objects. A keyboard 20 is coupled to processor chassis 12, enabling a user to enter keystrokes for controlling the personal computer system and to enter data and instructions employed in applications that execute on the personal computer system. A mouse 22 is included for control of a cursor on the display monitor and serves as an alternative user interface (besides keyboard 20) to enable input by a user or for selecting options presented graphically on the display monitor. Also mounted within processor chassis 12 is a CD-ROM drive 27 for use in reading data stored on a CD-ROM.

A block diagram 11 in FIG. 2 indicates several of the functional components included within processor chassis 12; these components are coupled to a data bus 13 disposed on the motherboard (not separately shown). The components include a display interface 15, which is used for driving display monitor 18 so that text and graphic images in applications are presented on the display monitor. A hard drive and floppy drive interface 17 couples floppy disk drive 14 and hard drive 16 to data bus 13 and serves as a bi-directional interface for transferring data and control signals between the data bus and these devices. A serial/mouse port 19 provides an interface for mouse 22 to connect to data bus 13; however, a bus mouse interface (not shown) can be used instead. A CD-ROM interface 29 transfers data and files from CD-ROM drive 27 to data bus 13.

Also coupled to data bus 13 is a memory 21. The memory includes both read only memory (ROM) and random access memory (RAM) components. The RAM is volatile, so that data stored within the RAM will be lost if the personal computer system is deenergized; however, RAM is typically required for storing machine instructions and variables that are to used by CPU 23 while running an application. In contrast, the data and machine instructions stored within the ROM are maintained for subsequent retrieval, even after the computer is deenergized, and normally are not altered by the user.

Data bus 13 conveys binary data between the functional components of the personal computer system and CPU 23. The CPU executes machine language instructions that are loaded into the RAM or permanently stored in ROM produces output signals to control devices such as the display monitor. Typically, the machine instructions that define applications to be executed by the computer are loaded into RAM from hard drive 16 (or from a floppy disk that is read by floppy drive 14). However, one or more files containing instructions that will be executed by the CPU can also be loaded into the RAM or stored on hard drive 16 for later use from a CD-ROM read by CD-ROM drive 27. While also used for other purposes, CD-ROMs are most often the medium of choice for distributing multimedia works.

Multimedia works typically include many graphic objects. Therefore, it is not surprising that a preferred embodiment of the present invention is disclosed for use in displaying graphic objects within a multimedia work. Personal computer system 10 is considered a multimedia type computer because it includes, in addition to CD-ROM drive 27, a sound card 30, which is connected to data bus 13 and to an amplifier and speaker system 32. Much of the following disclosure of a preferred embodiment of the present invention relates to its use for displaying objects in multimedia works. Yet this disclosed application of the invention should not be viewed as a limitation on the application of the present invention, since it can also provide a benefit when employed in other types of applications besides multimedia works. One example of such an application is a network browser such as those used for displaying WorldWideWeb pages on the Internet. Such pages often include multiple objects that were developed with different color palettes, which must be displayed in the same window, and in which the graphic objects displayed on the screen may change as the user activates different hyperlinks. It is therefore not essential that personal computer system 10 be of the multimedia type in order to execute the present invention or benefit from its functional utility.

A current preferred embodiment of the invention is integrated within a multimedia authoring program called SYMMETRY™. This program was initially written to run under Microsoft's WINDOWS graphic user interface operating system but may be ported to run under other operating systems. With the SYMMETRY program, an author can assemble graphic objects such as bit-mapped images, animations, and videos and audio components such as "WAVE" (*.WAV) files that store digitized sound, or musical instrument device interface (MIDI) files, to produce a multimedia work. The multimedia work is created using a full (editing) version of the SYMMETRY program. Once the multimedia work is completed, it can be transferred from the author's hard drive to a master CD-ROM with a CD-ROM recorder (not shown), and then duplicated and distributed to end users on conventional CD-ROMs. Each CD-ROM distributed will include a run-time version of the SYMMETRY program for use in playing the multimedia work.

A multimedia work created with the SYMMETRY program normally comprises a plurality of pages. A page may include one or more graphic objects, each of which will have been created with a color palette. Often the color palettes associated with each of the graphic objects introduced onto a page of the multimedia work may be very different. As explained above, most graphic user interface operating systems such as WINDOWS do not produce an acceptable palette for simultaneously displaying graphic objects associated with different color palettes. Accordingly, the present invention can be used to improve the screen appearance in virtually any application in which a plurality of graphic objects produced with different color palettes must be simultaneously displayed.

In the SYMMETRY program, an optimized color palette with a maximum of 236 different colors can be used for displaying graphic objects on a screen. An optimal color palette 40 in FIG. 3 that includes 256 cells is created with the SYMMETRY program. The preferred embodiment of the present invention always copies 16 of the 20 system colors into the available 236 color slots that can be set to define the common color palette to ensure that any color animation employed in the multimedia work created with the authoring program does not affect the 20 system colors, e.g., those used on control buttons or icons in a work. It is a simple matter of design choice that only 16 "preferred" system colors are copied into this palette for use by the graphic objects, and either more, less, or even none of the system colors might be copied into the available color slots, depending on the personal preference of the programmer.

Figures 3, 4:
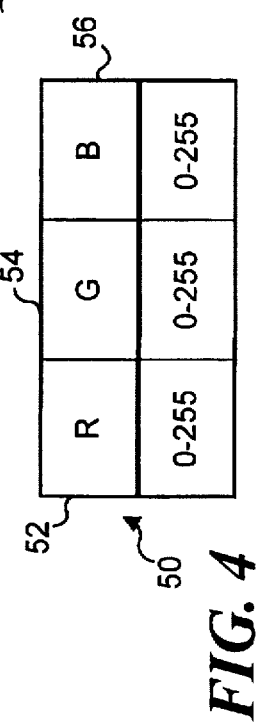
FIG. 3 is a color palette chart indicating that 256 colors are available in an optimal color palette for visual display on a computer monitor, 20 of which are reserved for the system.
FIG. 4 shows the three primary colors that define an 8-bit color in the 256-color optimal color palette.

Since the preferred embodiment initially created is intended to execute under the WINDOWS graphic user interface operating system, it complies with the requirement imposed by this operating system that 20 of the colors in a palette of 256 colors be reserved for displaying elements of the operating system, including scroll bars, window title bars, etc. As shown in FIG. 3, 10 of the system colors are reserved in the optimal color palette, beginning with a first system color ("SYS 1") at a first cell 42, and the remaining 10 system colors are assigned to the last 10 cells, ending with the last system color ("SYS 256") in a cell 44. The remaining 236 cells 46, labeled as "P 11" through "P246" in FIG. 3, indicate the cells in which additional colors can be assigned to the optimal color palette. All colors in the optimal color palette, including the system colors, can be used to display graphic objects on the screen of the display monitor. Although the last palette color is assigned to a (246th) cell 48 in the exemplary optimal color palette shown in FIG. 3, it should be noted that fewer than 236 assigned colors may be used in the optimal color palette.

FIG. 4 illustrates a red, green, and blue (RGB) primary color scheme 50, which is used in the preferred embodiment to define the components of each color in optimal color palette 40. Other schemes employing parameter values defining hue, saturation, and brightness (HSB) could alternatively be used for this purpose. In the RGB color scheme preferably employed, eight bits are used for each primary color to indicate the contribution of the primary color components, red, green, and blue, that are combined to define the color assigned to a cell in the optimal color palette. The same scheme is applied to define the contribution of each primary color component to colors in the color palettes originally associated with each graphic object.

In the RGB scheme, the contribution of each of the three primary colors may range from zero through 255, as indicated in blocks 52, 54, and 56 of FIG. 4. Accordingly, in optimal color palette 40, each of the cells (both those used by the operating system and those that are assignable) include three 8-bit values, each value indicating the contribution of one of the three primary colors to the color assigned to that cell (or an index to a lookup table in which the three 8-bit values are stored). Likewise, the color palettes originally used with each graphic object will have the 20 system colors and up to 236 assigned colors—each color comprising varying amounts of the three primary colors.

Before discussing the procedure used to develop optimal color palette 40 in the SYMMETRY multimedia authoring program, it is helpful to understand how that program is used in creating a multimedia work. With the program, an author creates a plurality of pages on each of which are selectively inserted one or more objects. Pages in the multimedia work may play in a defined sequential order, or the user that plays the multimedia work after it is distributed may be able to selectively control the order in which at least some of the pages execute and may be able to affect the graphic objects that appear on a page using controls embedded in the work.

When a multimedia work is being created by an author, graphic objects such as bit-mapped images are usually imported into an image frame, which is positioned on a page by the multimedia author. If only a single image or graphic object has the focus under the WINDOWS graphic user interface operating system, the color palette originally associated with the graphic object can be used to display the object. The conventional technique employed by the operating system, of using a linear traversal technique to determine the palette for displaying multiple graphic objects, will often result in a significant color degradation of one or more of the graphic objects, assuming that each of the graphic objects was created with a substantially different color palette. In contrast, the present invention determines an optimal color palette for this purpose so that the multiple graphic objects can be simultaneously displayed, with only a slight or barely perceptible degradation in the color rendition of each object.

Figure 5:
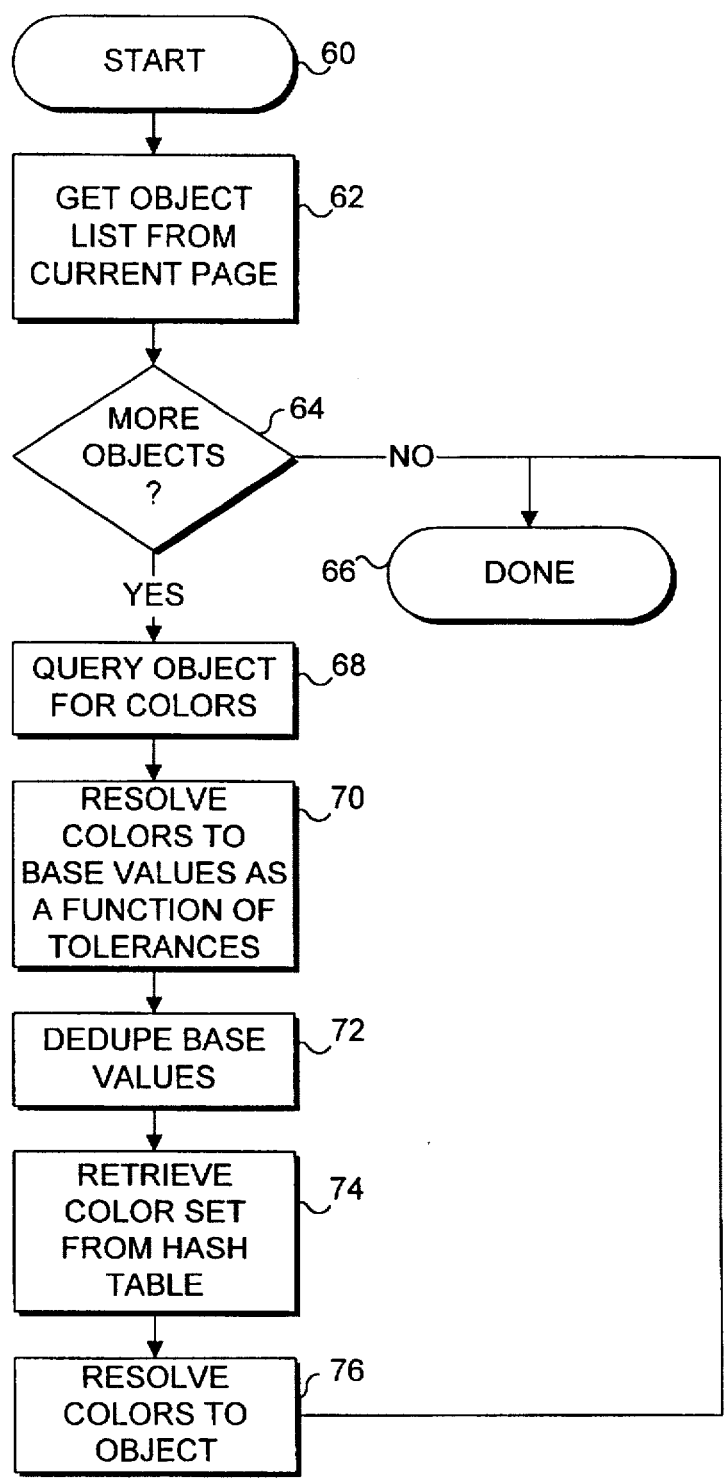
FIG. 5 is a flow chart illustrating the steps involved in determining the optimal color palette in accord with the present invention.

The steps involved in producing an optimal color palette like table 40 are shown in FIG. 5, beginning with a start block 60. In a block 62, the CPU is instructed to fetch an object list for a page that is to be opened on the display monitor. The object list includes each of the graphic objects on the page that will next be opened on the screen.

A decision block 64 determines if more objects remain on the list to be processed (i.e., have all of the objects on the page been processed in determining the optimal color palette?). If no objects remain, processing terminates, as indicated in a block 66. However, for the first and any subsequent objects remaining in the list, the logic proceeds to a block 68 in which the operating system queries the data defining the current object being processed to determine the colors used in the palette associated with that object. These colors comprise the color palette originally associated with the image or graphic object or subsequently assigned to it during any editing of the color palette.

In a block 70, the operating system resolves the colors of the object's color palette to base values to determine if the colors should be inserted in a "hash table." In this step, a color in the original palette is compared to the colors already in the hash table. Initially, the hash table includes only the 16 selected colors of the system colors, which are preferably copied into the hash table, as explained above. A color in the original palette associated with an object is added to the hash table if the primary color components of that color all differ from the primary color components (red, green, and blue) of any color already entered into the hash table by more than a specified tolerance. This process is repeated until all 236 colors (or 220 colors—after copying 16 system colors) are assigned in the hash table.

An example will serve to clarify this process. In this example, the tolerance for each of the three primary colors red, green, and blue has been set to a value of four. A base color already in the hash table has RGB components of 65, 35, and 94, respectively, and is the closest match to a color currently being evaluated, which has RGB components 67, 38, and 92. Since the differences between the RGB components of the base color and the RGB components of the color being evaluated are all less than the tolerance for each component, the color being evaluated is not added to the hash table. However, if the color being evaluated instead has RGB components of 67, 40, and 92, it will be added to the hash table (assuming that no other color already in the hash table has RGB components that are within the tolerance).

As will be explained below, in the SYMMETRY program, an author has the option of modifying a default tolerance for each of the primary colors. In the preferred embodiment, the default tolerance is one. However, for each primary color, the tolerance can be independently set to a value between zero and 255. As indicated in a block 72, any colors in the original color palette for an object that are within the tolerance for each of the components of a color already in the hash table is simply discarded, thereby "deduping the base values" of colors that are relatively close to the colors already in the hash table. This technique determines an optimal color palette that serves well to display the objects having different color palettes and minimizes the processing time required to modify the optimal palette when a new object is added to the screen, since it will not be necessary to remap colors for the existing objects.

In a block 74, the colors in the hash table are retrieved after all colors in the palette of the current object on a page have been processed; this set of colors comprises the optimal color palette for all objects processed up to this point. The optimal color palette may include less than 256 colors if only a few colors were used in each of the color palettes originally associated with the objects processed. A block 76 provides for resolving the colors to the object currently being processed so that the object is displayed with the colors currently in the optimal color palette. The logic then loops back to decision block 64 to process any further objects remaining on the current page. Once all objects have been processed, the optimal color palette that results is used for displaying all of the graphic objects on the page.

Under the SYMMETRY program, interactive editing enables an author to selectively add additional graphic objects to a page. The page can then be immediately displayed by running the work, without compiling or interpreting the code used to define the page. The present invention supports this immediate run capability, since graphic objects added to a page are simply factored into the hash table that is used to produce the optimal color palette for the page before the page is opened on the display. Accordingly, adding additional graphic objects may cause additional colors to be added to the optimal color palette, up to the limit of 236 (including the 16 system colors that are copied). Once the optimal color palette is filled, processing of the color palettes of objects on the page ceases, since no additional colors can be added.

It will be apparent that the first objects that are processed will have priority in determining the colors in the optimal color palette, since once all assignable colors are determined, colors from a palette originally associated with the next object that is processed will not be added to the palette, even if all of the primary components of the colors differ from those of all other colors in the optimal color palette by more than the specified tolerance(s). Objects on a page are processed in "Z-plane" order, depthwise, from back to front. The Z-plane order of objects can be selectively controlled in the SYMMETRY program. Normally, however, the first object placed on a page in a multimedia work will be at the back of the Z-plane order (first to be processed), and each subsequent object added to the page will be placed successively in front of all previously added objects. Thus, to some extent, an author can determine which objects on a page will have priority in determining the colors used in the optimal color palette simply by controlling the Z-plane order of the objects or selectively changing the order. Yet, the need for some objects to be in front of other objects based on the content or play of the multimedia work may constrain the author's control of this parameter.

In the event that the author wishes to use more of the colors in the original color palette of a specific graphic object to create the optimal color palette, it is also possible to reduce the total number of colors in the palette associated with another graphic subject that is included on the page, for example, by using a utility program to edit the color palette of the object. Alternatively, it is also contemplated that a color histogram technique could be incorporated into SYMMETRY to reduce the number of colors used by an object, by selecting only N most frequently used colors from the total number of colors in the palette associated with an object. Other color reduction techniques can also be employed. If the number of colors in a graphic object's color palette is reduced before that object's color palette is used in determining the optimal color palette, the object will fill fewer of the available color slots in the optimal color palette. A graphic object having fewer colors in its color palette would leave more color slots available to be determined by a subsequently processed graphic object than one with more colors, enabling the preferred graphic object to be displayed with an optimal color palette that includes more of the colors from the original color palette of the preferred graphic object.

Figure 6:
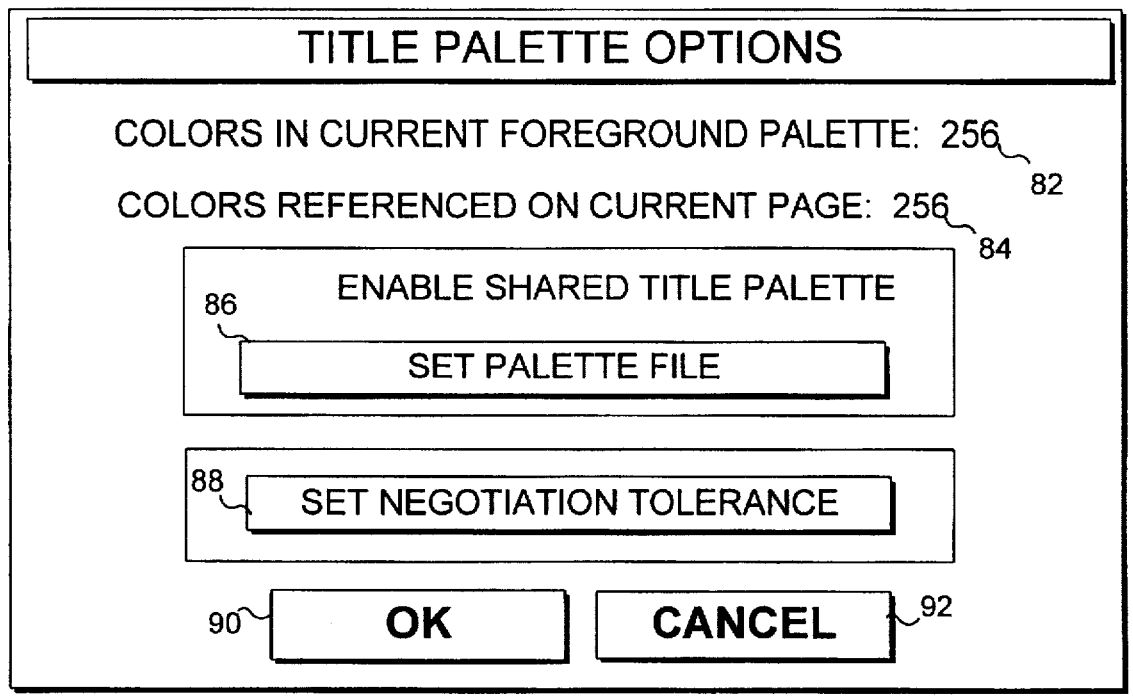
FIG. 6 is a dialog box that indicates the number of colors in a current palette and on the current page, and enables a user to set palette parameters.

The SYMMETRY program provides the author with information concerning the number of colors in the current foreground palette and the number of colors referenced on the current page. In FIG. 6, a title palette options dialog box 80 is illustrated. In this example, lines 82 and 84 of the dialog box indicate that 256 colors are respectively used for the current foreground (optimal color) palette, and that 256 colors are used on the current page.

With a control 86 in dialog box 80, an author can selectively enable an existing shared title palette (file) to be used for displaying the objects on a page instead of creating an optimal color palette. Further, the dialog box enables an author to specify the negotiation tolerance for each of the red, green, and blue primary components of the colors used in creating the optimal color palette by selecting a control 88. Conventional control buttons 90 and 92 respectively enable the user to select OK or CANCEL once work in the title palette options dialog box is complete.

Figure 7:
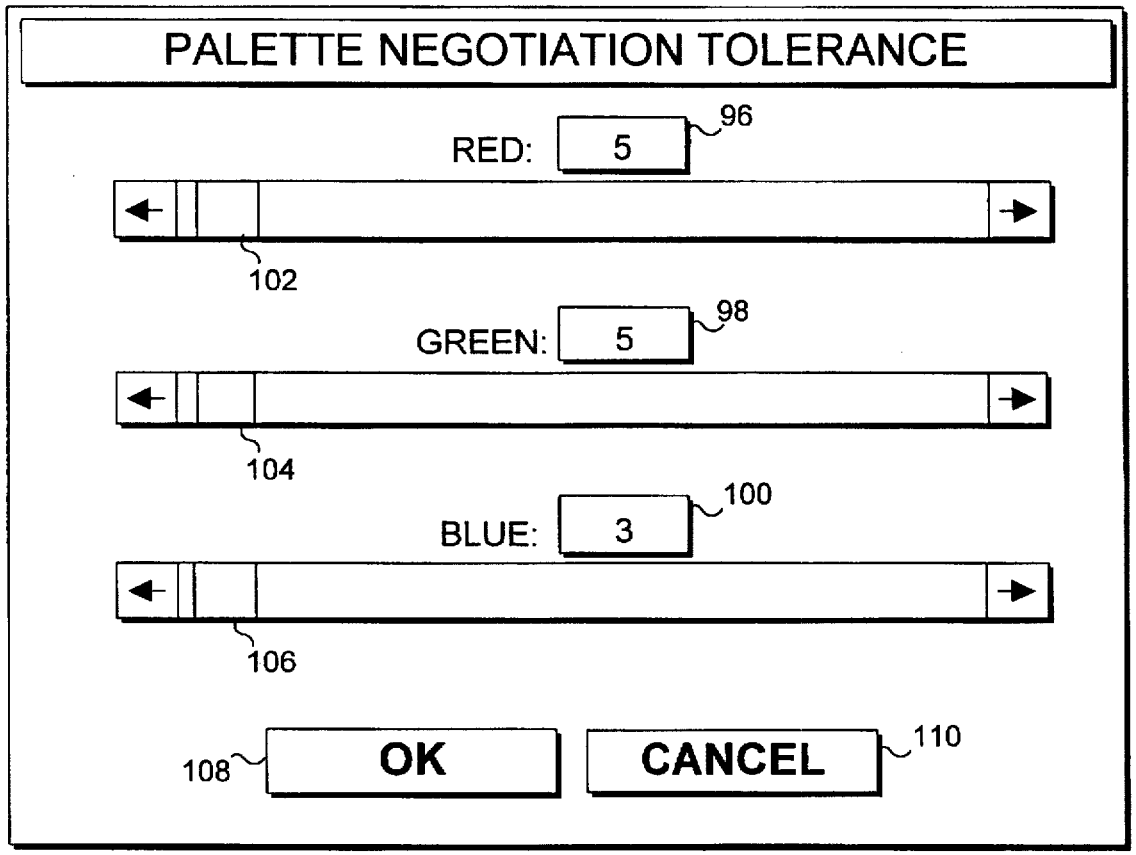
FIG. 7 is a palette negotiation tolerance dialog box that enables a user to adjust the tolerance level for each of three primary colors.

In FIG. 7, a palette negotiation tolerance dialog box 94 is illustrated. This dialog box is opened after the user actuates control 88 in the title palette options dialog box 80 described above, to set the palette negotiation tolerance. The palette negotiation tolerance dialog box includes three text boxes 96, 98, and 100, respectively, that display the red, green, and blue tolerance values. These values can be selected either by direct text input within the text boxes on keyboard 20, or can be set by adjusting sliders 102, 104, and 106, respectively, with mouse 22. Conventional dialog box control buttons 108 and 110 respectively enable the user to select OK or CANCEL after the palette negotiation tolerance dialog box is opened and the values are set.

The present invention has been described in an application that creates an optimal color palette for displaying graphic objects when a multimedia work is run; yet, it will be apparent that the same technique can be applied to various other types of applications. The ability to adjust the tolerance used in hashing colors enables the author (user) to affect the total number of colors in the optimal color palette, and thus to determine the minimum variation between those colors. By adjusting the tolerance of the primary color components to different values, it is possible for the author to establish greater or less variation in a specific primary color component, relative to the other primary color components of the colors in the optimal color palette.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for determining an optimal color palette for use in displaying a plurality of graphic objects on a computer display, each graphic object having an associated color palette, comprising the steps of:

(a) creating a table having a variable number of entries, each entry corresponding to a different color in the optimal color palette;

(b) repetitively adding the colors from the color palettes associated with each of the graphic objects to the table, if said colors from said color palettes differ from any previous entry in the table by more than a predefined tolerance; and (c) assigning the colors in the table to the optimal color palette for use in displaying the graphic objects on the computer display.

2. The method of claim 1, further comprising the step of using the optimal color palette to simultaneously display the plurality of graphic objects on the computer display.

3. The method of claim 1, wherein if a new graphic object is added to the plurality of objects to be displayed, further comprising the step of adding additional entries to the table and thus to the optimal color palette from a color palette associated with the new graphic object, until the optimal color palette is full.

4. The method of claim 3, wherein colors in the color palette associated with the new graphic object are added to the table if they differ from the entries in the table by more than the predefined tolerance.

5. The method of claim 1, further comprising the step of modifying the predefined tolerance to alter a range of the colors comprising the optimal color palette.

6. The method of claim 1, wherein a subset of the colors in the optimal color palette are reserved for use by a graphic user interface system.

7. The method of claim 1, wherein a separate predefined tolerance is assigned to each of a plurality of primary colors used to define each color in the optimal color palette.

8. A method for determining an optimal color palette for simultaneously displaying a plurality of graphic objects on a computer display, each graphic object having a color palette associated with it, said method comprising the steps of:

(a) deduping the color palettes associated with the graphic objects by only adding a color to the optimal color palette from said color palettes if said color differs from another color already in the optimal color palette by at least a predefined tolerance;

(b) increasing the predefined tolerance and repeating step (a) if the number of colors in the optimal color palette reaches a predefined maximum prior to processing all of the colors in the color palettes associated with the plurality of graphic objects; and (c) using the optimal color palette to display the graphic objects on the computer display.

9. The method of claim 8, further comprising the step of deduping colors in a color palette associated with any new graphic object by repeating steps (a) through (c) in connection with said colors in said color palette associated with the new graphic object.

10. The method of claim 8, further comprising the step of reserving a predefined number of colors comprising a subset of the optimal color palette for a plurality of graphic user interface system colors.

11. The method of claim 8, further comprising the step of enabling a user to adjust the predefined tolerance for each of a plurality of primary colors.

12. The method of claim 8, further comprising the step of reducing the number of colors in the color palette associated with one of the plurality of graphic objects prior to step (a) to enable additional colors to be made available in the optimal color palette for others of the plurality of graphic objects.

13. The method of claim 8, further comprising the step of reporting a total number of colors used in a selected one of the graphic objects.

14. The method of claim 8, wherein the optimal color palette is determined for each page of a multimedia work.

15. A system for determining an optimal color palette to display a plurality of graphic objects, each graphic object each having an associated color palette and the optimal color palette having a predetermined maximum number of colors, comprising:
(a) a computer, said computer including:
  (i) a central processing unit;
  (ii) a memory for storing machine instructions that control the central processing unit;
  (iii) a monitor that is coupled to the central processor, for displaying text and graphics;
  (iv) a non-volatile storage medium in which are stored machine instructions that are selectively loaded into memory to control the central processing unit; and
  (v) an operator interface that enables a user to provide input to the central processing unit; and
(b) said machine instructions that are stored on the non-volatile storage medium, when loaded into memory and executed by the central processing unit, comprising:
  (i) means for hashing colors in the color palettes associated with the plurality of graphic objects to select colors for entry in the optimal color palette by comparison to a predefined tolerance; and
  (ii) means for displaying the graphic objects on the monitor using the optimal color palette.

16. The system of claim 15, wherein the non-volatile storage medium comprises a hard drive and the graphic objects comprise a multimedia work that is created and stored on the hard drive.

17. The system of claim 15, wherein the machine instructions executed by the central processing unit comprise means for enabling an operator to selectively determine the predefined tolerance.

18. The system of claim 15, wherein the predefined tolerance comprises a separate tolerance value for each of a plurality of primary colors.

19. The system of claim 15, wherein the machine instructions executed by the central processing unit comprise means for enabling an operator to selectively reduce a number of colors in the color palette associated with a selected one of the plurality of graphic objects prior to hashing the colors to provide additional space in the optimal color palette to include colors based on the color palettes associated with others of the plurality of graphic objects.

20. The system of claim 15, wherein the predetermined maximum number of colors in the optimal color palette include a subset of colors that are determined by a graphic user operating system under which the optimal color palette is used to display the plurality of graphic objects.

21. The system of claim 15, wherein the machine instructions executed by the central processing unit comprise means for adding colors to the optimal color palette from a color palette associated with a new graphic object, by hashing the colors in the color palette associated with the new graphic object based upon the predefined tolerance to determine new colors for the optimal color palette.

22. The system of claim 21, wherein the means for adding are operative to add colors to the optimal color palette until the number of colors in the optimal color palette is equal to the predetermined maximum, or until all colors in the color palettes associated with the graphic object to be displayed have all been processed, whichever occurs first.

23. An article of manufacture adapted for use with a computer, for determining an optimal color palette for use in displaying a plurality of graphic objects on a computer display, each graphic object having an associated color palette, comprising:
a memory medium for storing machine instructions that are executable by the computer, said machine instructions providing for:
  (a) creating a table in a memory of the computer, said table having a variable number of entries, each entry corresponding to a different color in the optimal color palette;
  (b) repetitively adding the colors from the color palettes associated with each of the graphic objects to the table, if said colors from said color palettes differ from any previous entry in the table by more than a predefined tolerance; and
  (c) assigning the colors in the table to the optimal color palette for use in displaying the graphic objects on the computer display.

24. The article of manufacture of claim 23, wherein the machine instructions further provide for using the optimal color palette to simultaneously display the plurality of graphic objects on the computer display.

25. The article of manufacture of claim 23, wherein if a new graphic object is added to the plurality of objects to be displayed, the machine instructions further provide for adding additional entries to the table and thus to the optimal color palette from a color palette associated with the new graphic object, until the optimal color palette is full.

26. The article of manufacture of claim 25, wherein the machine instructions further provide that colors in the color palette associated with the new graphic object are added to the table if they differ from the entries in the table by more than the predefined tolerance.

27. The article of manufacture of claim 23, wherein the machine instructions further provide for modifying the predefined tolerance to alter a range of the colors comprising the optimal color palette.

28. The article of manufacture of claim 23, wherein a subset of the colors in the optimal color palette are reserved for use by a graphic user interface system.

29. The article of manufacture of claim 23, wherein a separate predefined tolerance is assigned to each of a plurality of primary colors used to define each color in the optimal color palette.

30. A method for determining an optimal color palette for use by a computer in displaying a plurality of graphic objects on a display, each graphic object having an associated color palette, comprising the steps of:

(a) creating a table having a variable number of entries, each entry corresponding to a different color in the optimal color palette;

(b) repetitively adding the colors from the color palettes associated with each of the graphic objects to the table, if said colors from said color palettes differ from any previous entry in the table by more than a predefined tolerance or until a separate color has been added to each entry in the table, said tolerance being adjustable so that the number of entries in the table will correspond to the number of colors in the optimal color palette; and (c) assigning the colors in the table to the optimal color palette, said palette being employed by the computer for displaying the plurality of graphic objects on the display.

* * * * *